United States Patent [19]

Kimura

[11] Patent Number: 4,812,174
[45] Date of Patent: Mar. 14, 1989

[54] METHOD FOR PROTECTING METALLIC SURFACES FROM CORROSION

[75] Inventor: Shiuji Kimura, 208-43 Musota, Wakayama, Japan

[73] Assignees: Teikoku Kako Co., Ltd., Osaka; Shiuji Kimura, Wakayama, both of Japan

[21] Appl. No.: 91,241

[22] Filed: Aug. 31, 1987

Related U.S. Application Data

[63] Continuation of Ser. No. 746,598, Jun. 19, 1985, abandoned.

[30] Foreign Application Priority Data

Jun. 19, 1984 [JP]  Japan ................................. 127205

[51] Int. Cl.$^4$ ............................................. C23C 22/02
[52] U.S. Cl. .................................. 148/251; 106/14.35; 148/247; 148/248; 148/275

[58] Field of Search ................ 252/393, 396; 106/14.35, 14.11, 14.05; 148/6.14 R

[56] References Cited

U.S. PATENT DOCUMENTS

| | | | |
|---|---|---|---|
| 3,585,159 | 6/1971 | Miharg | 106/14.35 |
| 3,753,924 | 8/1973 | Franiger | 106/6.14 R |
| 4,039,353 | 8/1977 | Kalick | 106/6.14 R |
| 4,247,344 | 1/1981 | Tsuda | 148/6.14 R |
| 4,609,406 | 9/1986 | Maggar | 106/14.35 |

*Primary Examiner*—Sam Silverberg
*Attorney, Agent, or Firm*—Millen & White

[57] ABSTRACT

Rust preventing resin composition comprising a condensate of tannic acid, a phenol and an aldehyde or a ketone formed in the presence of an acid catalyst. The composition may be used as anticorrosive or rust preventing coating compositions.

16 Claims, No Drawings

METHOD FOR PROTECTING METALLIC SURFACES FROM CORROSION

This is a continuation of application Ser. No. 746,598, filed June 19, 1985, now abandoned.

BACKGROUND OF THE INVENTION

This invention relates to a rust preventing resin composition for use in protecting metallic structures such as ships, building, machineries and the like made of iron, zinc, aluminum and their alloys.

Anticorrosive or rust preventing paints containing natural tannic acid are known. These paints utilize the ability of tannic acid to form a stable chelate with ion atoms. Examples of tannic acid-containing coating compositions are disclosed in Japanese Patent Publication Nos. 48,43727 and 49-35495, and also Japanese Patent Kokai (laid open) Nos. 51-152475, 57-152476 and 57-139155.

These prior art compositions, however, suffer from certain disadvantages in that they do not fully exhibit the chelate-forming activity of tannic acid with the decrease in rust preventing properties of the entire composition. The weakened chelate-forming activity also affects the adhesive strength of the resulting film so that the film tends to be liable to cracks and peeling off upon exerting mechanical stresses, shocks, heat and the like.

It is, therefore, a principal object of the present invention to provide a rust preventing resin composition comprising natural tannic acid which is free from the abovedescribed disadvantages.

Other objects and advantages will become apparent as the description proceeds.

DESCRIPTION OF THE INVENTION

According to the present invention, these and other objects may be accomplished by providing a rust preventing resin composition comprising a condensate of tannic acid, a phenol and an aldehyde or a ketone formed in the presence of an acid catalyst.

Examples of phenols which may be used include monophenols such as phenol, cresol and xylenol, di- and polyphenols such as catechol, resorcinol, pyrogallol and the like.

Examples of aldehydes which may be used include aliphatic monoaldehydes such as formaldehyde, acetaldehyde, acrolein and crotonaldehyde, aliphatic dialdehydes such as glyoxal and succinaldehyde, aromatic aldehydes such as benzaldehyde and salicyaldehyde, and heterocyclic aldehydes such as furfural.

Examples of ketones which may be used include aliphatic ketones such as acetone, methyl ethyl ketone, methyl vinyl ketone and mesityl oxide, alicyclic ketones such as cyclobutanone and cyclopentanone, aromatic ketones such as acetophenone and propiophenone, and heterocyclic ketones such as acetothienone, 2-acetofurone and the like.

Examples of acid catalysts include inorganic acids such as hydrochloric acid, sulfuric acid and phosphoric acid, and organic acids such as oxalic acid, tartaric acid, malic acid and the like. Organic acid catalyst are preferable because of milder reactions and thus the ease of reaction control.

From about 50 to 1,000 parts by weight of a phenolic component may be present relative to 100 parts by weight of tannic acid.

At least an amount of an aldehyde or ketone equal to the amount of phenolic component on molar basis should be employed.

The condensation reaction may be performed by a process similar to the well-known reaction to produce novolac type phenol resins.

It is postulated that tannic acid incorporated in this way is not liable to hydrolysis and thus its chelate-forming activity is not impaired significantly.

The resulting resin composition may be used as a rust preventing varnish or paint for protecting various iron based substrates. For example, the resin composition may be applied on an iron based substrate as a primer coating. The tannic acid moiety of the resin may form a chelate with ferric ions at the interface between the substrate and the coating film to contribute to improved rust preventing and strength characteristics of the film. Accordingly, the presence of thin layer of rust on the substrate would not interfere with the anticorrosive characteristics of the resin composition of the present invention and thus the conventional pretreatment of substrate for removing rust layer may be dispensed.

When the resin composition is applied on a cleaned substrate, the acid catalyst component would promote the formation of iron chelates.

After applying the composition of the present invention onto a substrate as a primer coating, a conventional coating composition may be applied thereon for protective and/or decorative purposes. Examples of resins which may be employed for the preparation of such top coat compositions include phenol resins, alkyd resins, aminoalkyd resins, guanamine resins, polyvinyl chloride resins, polyvinyl butyral resins, styrene-butadiene resins, chlorinated rubber, epoxy resins, acrylic resins, unsaturated polyester resins, polyurethane resins, silicone resins, titanium resins and mixtures of these resins.

Alternatively, the composition of the present invention may be admixed with these conventional coating compositions for improving rust preventing properties thereof.

The composition of the present invention may find uses, in addition to the use as a primer coating for iron based substrates, in rust-preventing additives for rust-preventing oils, antifreezing liquids and the like.

The invention is further illustrated by the following examples in which all parts are by weight.

EXAMPLE 1

To a flask equipped with a reflux condenser were added 100 parts of purified natural tannic acid extract, 50 parts of phenol, 80 parts of a 37% solution of formaldehyde and a catalytic amount of oxalic acid.

The above mixture was gradually heated to 60° C. and stirred for 2 hours at the same temperature. Then the temperature was raised to 90° C. and the reaction was continued with stirring for additional 3 hours until the reaction mixture became cloudy. The reaction was further continued under the same condition for 3 hours. Thereafter, the reaction mixture was cooled to room temperature and allowed to stand for 2 minutes. The resulting supernatant was removed by decantation and 200 parts of n-butanol were added to the residue to give about 320 parts of a clear resinous solution.

EXAMPLE 2

The procedure of Example 1 was repeated except that 65 parts of acetaldehyde were used instead of formaldehyde solution. 330 parts of a clear resinous solution were obtained.

EXAMPLE 3

The procedure of Example 1 was repeated except that 96 parts of furfural were used instead of formaldehyde solution. 345 parts of a clear resinous solution were obtained.

The resin solutions of Examples 1-3 were applied, respectively, onto a cold rolled steel panel and allowed to dry at room temperature. The coating films turned black as they are dried and remained intact when the panels were soaked in water after fully drying.

EXAMPLE 4

The resinous solution of Example 1 was applied on a degreased cold rolled steel panel to a thickness of 10 microns and then dried at room temperature for one week to give Sample No. 1.

Similarly, a commercial wash primer containing zinc chromate was applied on the same cold rolled steel panel and dried under the same condition to give Sample No. 2.

Samples No. 1 and No. 2 were subjected to the conventional salt spray testing for 72 hours and visually observed. The results are shown in Table 1.

TABLE 1

| Sample | Rust | Blister |
| --- | --- | --- |
| No. 1 | ○ | ○ |
| No. 2 | Δ-X | ○ |

The symbols used herein refer to the evaluation of results in the following order from the best towards the worse:

◎ > ○ > Δ > X

As shown in Table 1, Sample No. 1 coated with the resin solution of Example 1 was better than Sample No. 2 coated with a commercial wash primer in the development of rust and blister and therefore in rust preventing characteristics.

EXAMPLE 5

The resinous solution of Example 2 was applied on a cold rolled steel panel having a thin layer of rust to a thickness of 10 microns and dried at room temperature for one week. Then a medium oil length alkyd paint having the following composition:

| | |
| --- | --- |
| Medium oil length alkyd resin (BECKOSOL 1334 EL, DAINIPPON INK AND CHEMICALS, INC.) | 45.0 parts |
| Barium Sulfate + ocher | 34.1 parts |
| Talc | 6.3 parts |
| Solvent | 12.3 parts |
| Dryer | 1.0 parts |
| Additive | 1.3 parts |
| Total | 100.0 parts | was applied thereon to a thickness of 20 microns and dried at room temperature for one week to give Sample No. 3.

Similarly, a rust preventing paint having the same formulation as above except that 6.3 parts of talc was replaced with the same amount of zinc chromate was applied on the same steel panel to a thickness of 30 microns and dried at room temperature for one week to give Sample No. 4.

Samples No. 3 and No. 4 were subjected to the conventional salt spray testing for 240 hours and visually observed. The results are shown in Table 2.

TABLE 2

| Sample | Rust | Blister |
| --- | --- | --- |
| No. 3 | ○ | ○ |
| No. 4 | Δ | Δ-X |

EXAMPLE 6

The resinous solution of Example 3 was applied on a galvanized steel panel to a thickness of 5 microns and dried at 50 C. for 2 hours. Then an acrylic enamel having the following composition:

| | |
| --- | --- |
| Acryl resin (ACRYDIC A-405, DAINIPPON INK AND CHEMICALS, INC.) | 43.8 parts |
| Melamine resin (SUPER BECKAMINE J-820, DAINIPPON INK AND CHEMICALS, INC.) | 15.6 parts |
| Titanium dioxide | 31.3 parts |
| Calcium carbonate | 3.0 parts |
| Solvent | 6.3 parts |
| Total | 100.0 parts | was applied thereon to a thickness of 15 microns and baked at 130° C. for 30 minutes to give Sample No. 5.

Similarly, an acrylic enamel having the same formulation as above except that 3.0 parts of calcium carbonate was replaced with the same amount of zinc chromate was applied on the same galvanized panel to a thickness of 20 microns and baked at 130° C. for 30 minutes to give Sample No. 6.

Samples No. 5 and No. 6 were subjected to the conventional salt spray testing for 500 hours and visually observed. The results are shown in Table 3.

TABLE 3

| Sample | White rust | Blister | Adhesive strength |
| --- | --- | --- | --- |
| No. 5 | ○ | ○ | ◎ |
| No. 6 | ◎ | Δ | Δ |

EXAMPLE 7

10 parts of the resinous solution of Example 2 were thoroughly mixed with 100 parts of the medium oil length alkyd paint used in Example 5. The mixture was applied on a cold rolled steel panel to a thickness of 30 microns and dried at room temperature for one week to give Sample No. 7.

The rust preventing paint used in Example 5 for comparative purpose was applied on the same steel panel to the same film thickness and dried under the same condition to give Sample No. 8.

Samples No. 7 and No. 8 were subjected to the conventional salt spray testing for 240 hours and visually observed. The results are shown in Table 4.

TABLE 4

| Sample | Rust | Blister | Adhesive strength |
| --- | --- | --- | --- |
| No. 7 | ○ | ○ | ○ |
| No. 8 | Δ | Δ | X |

The above has been offered for illustrative purposes only, and it is not for the purpose of limiting the scope of this invention which is defined in the claims below.

What is claimed is:

1. A method of preventing rust on a metallic substrate containing iron, zinc, or aluminum, said method comprising applying to said substrate a composition comprising: a condensate of tannic acid, a phenol and a ketone formed in the presence of an acid catalyst; and a coating component, said coating component selected from alkyd resins, aminoalkyd resins, guanamine resins, polyvinyl chloride resins, polyvinyl butyral resins, styrene-butadiene resins, chlorinated rubber, epoxy resins, acrylic resins, unsaturated polyester resins, polyurethane resins, silicon resins, titanium resins or mixtures thereof.

2. A method for protecting metal products from oxidative corrosion which comprises applying a composition on the surface of a metallic substrate comprising iron, zinc, or aluminum, said composition comprising a resinous condensate of tannic acid, a phenol selected from the group consisting of phenol, cresol, xylenol, catechol, resorcinol, pyrogallol or a mixture thereof, and an aldehyde or a ketone in the presence of an acid catalyst.

3. The method according to claim 2, wherein said tannic acid is of the hydrolyzable type.

4. The method according to claim 2, wherein the porportion of said phenol is from about 50 to 1,000 parts per 100 parts of said tannic acid.

5. The method according to claim 2, wherein said aldehyde is selected from formaldehyde, acetaldehyde or furfural.

6. The method according to claim 2, wherein the amount of said aldehyde or ketone is at least equal to the amount of said phenol on molar basis.

7. The method according to claim 2, wherein said acid catalyst is oxalic acid.

8. The method according to claim 2, wherein said aldehyde is selected from formaldehyde, acetaldehyde, acroleine, crotonaldehyde, glyoxal, succinaldehyde, benzaldehyde, salicylaldehyde, or furfural.

9. The method according to claim 2, wherein said ketone is selected from acetone, methyl ethyl ketone, methyl vinyl ketone, mesityl oxide, cyclobutanone, cyclopentanone, acetophenone, propiophenone, acetothienone, or 2-acetofurone.

10. The method according to claim 2, wherein said acid catalyst is selected from hydrochloric acid, sulfuric acid, phosphoric acid, oxalic acid, tartaric acid, or malic acid.

11. The method according to claim 2, wherein said metallic substrate is not pretreated prior to the formation of said composition on the surface of said metallic substrate.

12. The method according to claim 2, further comprising applying a top coating to said composition, said top coating comprising a resin selected from phenol resins, alkyd resins, aminoalkyd resins, guanamine resins, polyvinyl chloride resins, polyvinyl butyral resins, styrene-butadiene resins, chlorinated rubber, epoxy resins, acrylic resins, unsaturated polyester resins, polyurethane resins, silicon resins, titanium resins or mixtures thereof.

13. A method according to claim 1, further comprising formulating said composition into a resinous solution prior to application to the substrate.

14. A method according to claim 13, wherein the step of formulating said composition into a resinous solution is performed by adding n-butanol as a solvent to said composition.

15. A method according to claim 2, further comprising formulating said composition into a resinous solution prior to application to said surface.

16. A method according to claim 15, wherein the step of formulating said composition into a resinous solution is performed by adding n-butanol as a solvent to said composition.

* * * * *